United States Patent
Isaacson

(10) Patent No.: US 9,462,744 B2
(45) Date of Patent: Oct. 11, 2016

(54) AGRICULTURAL TOOL WITH ELECTRONICALLY CONTROLLED DOWNPRESSURE SYSTEM

(71) Applicant: John D. Isaacson, Dundas, MN (US)

(72) Inventor: John D. Isaacson, Dundas, MN (US)

( * ) Notice: Subject to any disclaimer, the term of this patent is extended or adjusted under 35 U.S.C. 154(b) by 106 days.

(21) Appl. No.: 14/192,208

(22) Filed: Feb. 27, 2014

(65) Prior Publication Data

US 2014/0251647 A1 Sep. 11, 2014

Related U.S. Application Data

(60) Provisional application No. 61/772,857, filed on Mar. 5, 2013.

(51) Int. Cl.
*A01C 7/20* (2006.01)

(52) U.S. Cl.
CPC ............... *A01C 7/205* (2013.01); *A01C 7/201* (2013.01)

(58) Field of Classification Search
CPC .............. A01B 63/111; A01B 63/114; A01B 63/1115; A01C 7/203; A01C 7/205
See application file for complete search history.

(56) References Cited

U.S. PATENT DOCUMENTS

| | | | | |
|---|---|---|---|---|
| 2,970,653 A * | 2/1961 | Hershman | ............ | A01B 63/114 172/465 |
| 3,749,035 A * | 7/1973 | Cayton | ................. | A01C 7/205 111/137 |
| 4,413,685 A * | 11/1983 | Gremelspacher | ...... | A01B 63/22 111/14 |
| 4,529,039 A * | 7/1985 | Sakundiak | ........... | A01B 63/114 172/4 |
| 4,553,605 A * | 11/1985 | Katayama | ............ | A01B 63/114 172/2 |
| 4,913,070 A | 4/1990 | Morrison | | |
| 5,234,060 A | 8/1993 | Carter | | |
| 5,653,292 A * | 8/1997 | Ptacek | ................... | A01C 7/203 172/239 |
| 6,085,846 A * | 7/2000 | Buchl | ................. | A01B 63/114 172/4 |
| 6,164,385 A * | 12/2000 | Buchl | ................. | A01B 63/1115 172/239 |
| 6,389,999 B1 | 5/2002 | Duello | | |
| 6,581,918 B2 | 6/2003 | Voelkel | | |
| 6,612,218 B2 * | 9/2003 | Yamaguchi | .......... | A01B 63/114 91/363 R |
| 6,701,857 B1 | 3/2004 | Jensen et al. | | |
| 7,401,561 B1 | 7/2008 | Kurz | | |

(Continued)

OTHER PUBLICATIONS

Ridetech, Internal Ride Height Sensor Advertisement, 2009.

*Primary Examiner* — Matthew D Troutman
(74) *Attorney, Agent, or Firm* — James W. Miller

(57) ABSTRACT

An agricultural tool for a tractor tool bar comprises a unit, such as a planter unit, that includes a ground contacting member for performing a working operation on the ground for changing the state of the soil, such as by opening a furrow to receive a seed from the planter unit. A downpressure system for the tool includes a two part telescopic air shock extending between the tool bar and a parallelogram linkage that attaches the unit to the tool bar. A sensor is operatively connected to the portion of the air shock that is attached to the parallelogram linkage for sending a signal representative of the length of the shock to an electronic controller. The controller operates through a feedback loop to attempt to maintain the air shock at a predetermined length which corresponds to a desired amount of downpressure.

8 Claims, 4 Drawing Sheets

(56) References Cited

U.S. PATENT DOCUMENTS

| | | | | |
|---|---|---|---|---|
| 8,448,717 B2* | 5/2013 | Adams | ................... | A01C 7/203 111/135 |
| 8,522,889 B2* | 9/2013 | Adams | ................... | A01C 7/203 111/136 |
| 2002/0104430 A1* | 8/2002 | Yamaguchi | .......... | A01B 63/114 91/358 R |
| 2005/0155536 A1* | 7/2005 | Wendte | ................. | A01O 5/068 111/200 |
| 2011/0005784 A1 | 1/2011 | Landoll et al. | | |
| 2012/0048159 A1* | 3/2012 | Adams | ................... | A01C 7/203 111/163 |
| 2012/0048160 A1* | 3/2012 | Adams | ................... | A01C 7/203 111/163 |
| 2012/0316673 A1* | 12/2012 | Riffel | ..................... | A01C 7/102 700/240 |
| 2013/0112121 A1* | 5/2013 | Achen | ................... | A01O 5/062 111/14 |
| 2014/0060862 A1* | 3/2014 | Gilstring | .............. | A01B 49/027 172/4 |
| 2014/0116735 A1* | 5/2014 | Bassett | ............... | A01B 61/044 172/2 |
| 2015/0073668 A1* | 3/2015 | Achen | ................... | A01O 5/062 701/50 |

* cited by examiner

AGRICULTURAL TOOL WITH ELECTRONICALLY CONTROLLED DOWNPRESSURE SYSTEM

TECHNICAL FIELD

This invention relates to agricultural tools that require downpressure to keep the tools properly engaged with the ground and/or to keep the tools working in a proper orientation or at a proper depth.

BACKGROUND OF THE INVENTION

Many agricultural tools used for soil tillage, planting and other purposes perform some type of working action on a farm field to change the state of the farm field. For example, soil tillage tools often use one or more rotary coulter discs that enter the soil to a desired depth to break up or till the soil to make the soil ready for planting. A large number of such soil tillage tools are usually mounted on an elongated, laterally extending tool bar that is coupled to the back of a tractor. This allows the soil to be tilled in a large swath behind the tractor as the tool bar and the soil tillage tools carried thereon are towed across a farm field by the tractor. The swath of tilled soil may be basically continuous across its width in a conventional tillage operation or may be separated by strips of untilled soil in a zone tillage operation depending upon the lateral spacing of the soil tillage tools relative to each other on the tool bar.

In some cases, soil tillage tools of the type described above are incorporated into a dedicated, single use tool whose only purpose is to break up or till the soil. After the soil is so tilled and when the farm field is ready for planting, the farmer will then use a separate planter tool to plant seeds into the tilled soil and to cover the planted seeds with soil. However, in other cases, the soil tillage tools may be incorporated into a planter unit such that the soil tillage and planting operations occur essentially at the same time. Regardless of whether the soil tillage and planting operations occur in a two step operation or in a single step operation, it is important that the tool act on or enter into the soil allow the soil to be properly tilled and/or the seeds to be properly planted at the right depth. In accomplishing this goal, most agricultural tools have some type of downpressure system that causes such tools to enter the soil to the proper depth and that attempts to retain the tools at such depth.

The aforementioned downpressure systems can be quite complex and expensive. Some of these systems use multiple mechanical springs or at least one bellows type air bag on each of the soil tillage tools in an attempt to provide sufficient downpressure. Such springs and air bags are exposed to the elements and can in certain situations become caked or fouled with dirt or debris from use, thereby decreasing their effectiveness in supplying the precise amount of downpressure required on the tools. This may result in some tools being located at the proper depth while other tools on the same tool bar are not at the proper depth.

In addition, variations in the soil compaction in the farm field can cause the amount of downpressure required on the tools to vary widely across the length of the tool bar or from one location to another in the farm field. Many downpressure systems known in the prior art are not able to adequately respond to such variations with the result again being that some tools may not be effectively maintained at the required depth. Thus, it would be an advance in the art to provide a downpressure system that is simple and inexpensive in nature, that is durable and is not prone to being fouled during use, and that effectively responds in a real time manner to changes in the downpressure that is required to thereby substantially continuously maintain the tools at the required predetermined depth.

SUMMARY OF THE INVENTION

One aspect of this invention relates to an agricultural tool for mounting on a tool bar, the tool bar being operatively carried on or attached to a tractor. The tool comprises a unit that performs an action on a farm field to change a state of the farm field as the unit is moved over the farm field. A linkage movably mounts the unit on the tool bar for up and down movement of the tool bar relative to the farm field. A system is provided for applying downpressure to the unit to maintain the unit in a desired operational position relative to the ground. The downpressure system comprises a fluid operated shock having first and second telescopic portions. The first portion of the shock is attached to the tool bar and the second portion of the shock is attached to the linkage. The shock is extensible and contractible in length dependent upon a pressure level of the fluid inside the shock. A source of pressurized fluid is provided. At least one valve is located between the source of pressurized fluid and the shock for supplying pressurized fluid to the shock or for removing the pressurized fluid from the shock. Finally, an electronic controller is connected to the valve for automatically operating the valve as the unit is moved over the farm field to add and remove as need be the pressurized fluid to the shock in a feedback control loop to substantially maintain the length of the shock at a predetermined length to establish and maintain a desired downpressure on the unit.

BRIEF DESCRIPTION OF THE DRAWINGS

This invention will be described more specifically in the following Detailed Description, when taken in conjunction with the following drawings, in which like reference numerals refer to like elements throughout.

DETAILED DESCRIPTION

Figure 1:
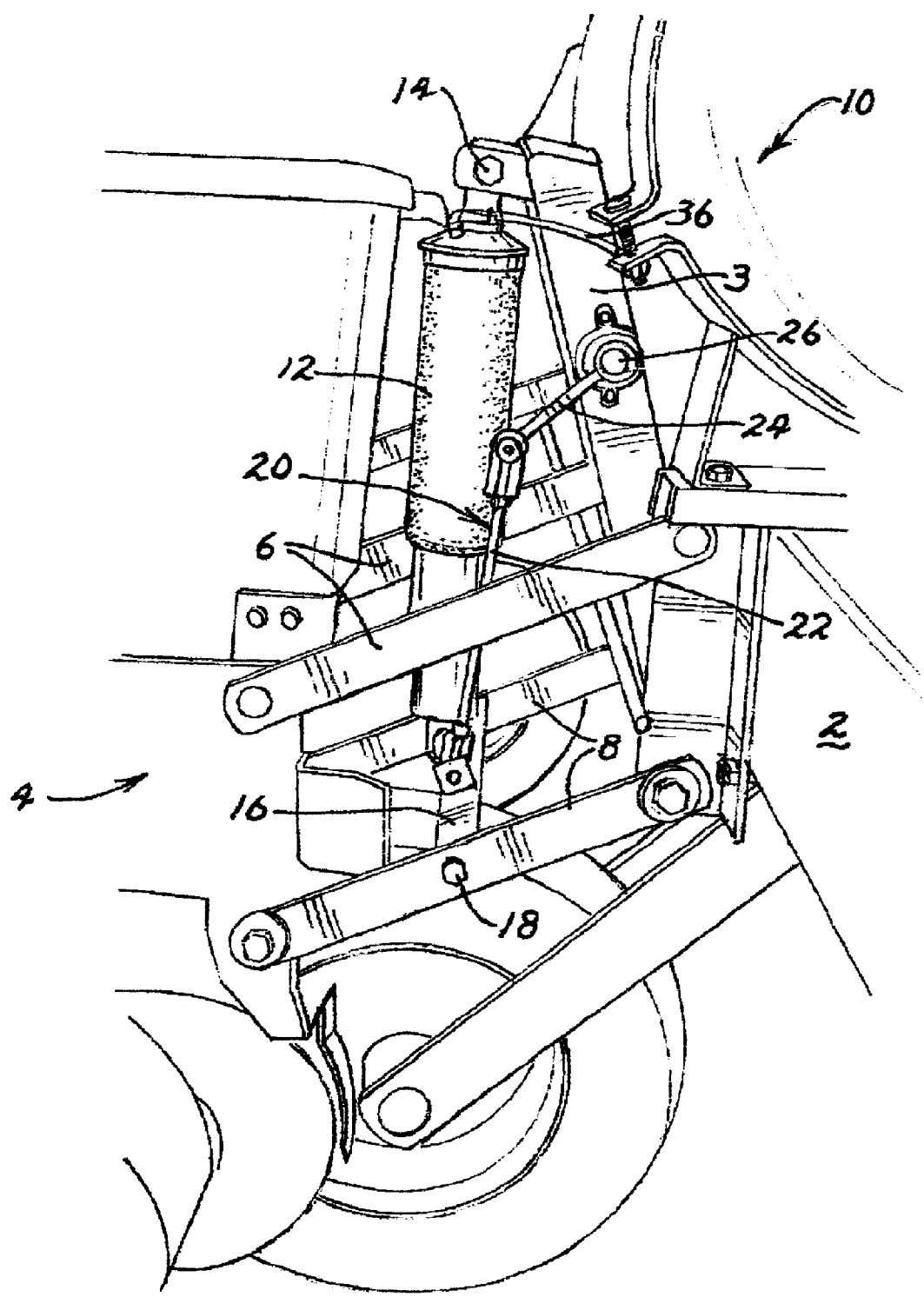
FIG. 1 is a perspective view of a portion of the downpressure system of this invention, particularly illustrating one of the downpressure applying devices of this invention connected to the pivotal linkage extending between an agricultural tool bar and one planter row unit connected to the tool bar for applying downpressure to the planter row unit.
Figure 2:
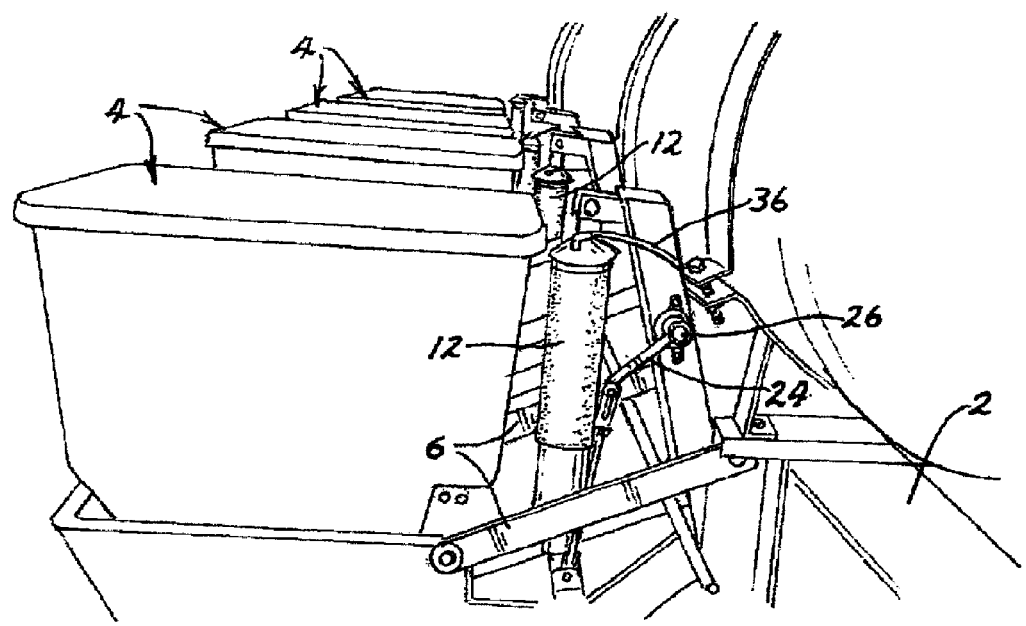
FIG. 2 is a perspective view similar to FIG. 1, particularly illustrating a four row planter with each planter row unit having its own separate downpressure applying device of the type shown in FIG. 1.

Referring first to FIGS. 1 and 2, a laterally elongated agricultural tool bar is generally illustrated as 2. Tool bar 2 is of the type that is commonly attached to tractors or the like in order to mount a plurality of agricultural tools in a side-by-side manner across the length of the tool bar. For example, as shown in FIG. 2, the agricultural tools can comprise four planter row units generally illustrated as 4. Planter row units 4 are designed to open a furrow in a farm field, to drop the seeds of a row crop (e.g. corn or soybeans) into such furrow, and to close the furrow as the tractor propels the tool bar 2 and planter row units 4 across the farm field. Each planter row unit 4 is attached to tool bar by a parallelogram pivot linkage having a pair of laterally spaced upper pivotal link arms 6 and a pair of laterally spaced lower link arms 8 which underlie the upper link arms 6.

This invention relates to a system 10 for applying controlled downpressure to planter row units 4 to ensure that planter row units 4 are maintained in a desired operational position on the ground. System 10 is not limited for use with planter row units 4 or with a particular number of planter row units 4. System 10 can be used with just one planter row unit 4 or as many planter row units 4 as one wishes to mount on or as can be mounted on tool bar 2. System 10 can also be used with agricultural tools other than planter row units which require downpressure to work properly, such as closing wheels, floating trash wheels, tillage tools, etc. One desirable characteristic of system 10 is that the downpressure on each planter row unit 4 can be controlled and maintained individually in an automatic fashion during operation of planter row units 4 without requiring manual adjustment or control by the operator.

As shown most clearly in FIG. 1, one portion of system 10 is a mechanical device, such as an air shock 12, which has an upper end pivotally connected to an upwardly extending post 3 on tool bar 2 by a pivot pin 14. The lower end of air shock 12 is secured to a cross member 16 with cross member 16 extending between lower link arms 8 of the parallelogram linkage for planter row unit 4. The opposite ends of cross member 16 are pivotally connected to lower link arms 8 by aligned pivot pins 18 (only one of which can be seen in FIG. 1). Thus, the upper and lower ends of air shock 12 are free to pivot about horizontal axes defined by pivot pins 14 and 18 as air shock 12 applies downpressure to planter row unit 4.

Air shock 12 is a conventional device in the automotive art that combines downpressure air bag type technology with a shock absorber. A suitable air shock 12 is commercially available from Ridetech of Jasper, Ind. In addition, a suitable air shock 12 is shown in U.S. Pat. No. 6,581,918, which patent is hereby incorporated by reference.

Referring still to FIG. 1, a pivot linkage 20 comprising a lower pivot arm 22 and an upper pivot arm 24 pivotally connects cross member 16 with a rotary sensor 26 carried on a post 3 of tool bar 2. Sensor 26 can take many different forms, but one suitable sensor 26 is a rotary electrical potentiometer. Lower pivot arm 22 is pivotally connected at its lower end to cross member 16 and at its upper end to the lower end of upper pivot arm 24. The upper end of upper pivot arm 24 is non-rotatably connected to the rotary input shaft or the like of sensor 26 such that up and down movement of upper pivot arm 24 rotates the rotary input shaft of sensor 26 in concert therewith. The purpose of pivot linkage 20 and sensor 26 is to detect up and down motion in the parallelogram linkage that supports planter row unit 4 on the ground by detecting changes in the distance between the pivot connection to cross member 16 and the fixed location of sensor 26. Sensor 26 provides a voltage signal to an electronic controller 28 that varies as the parallelogram linkage pivots up and down and as the distance between cross members 16 and sensor 26 changes correspondingly. Sensor 26 can be external to air shock 12 as shown herein or could also be built as part of air shock 12.

Figure 3:
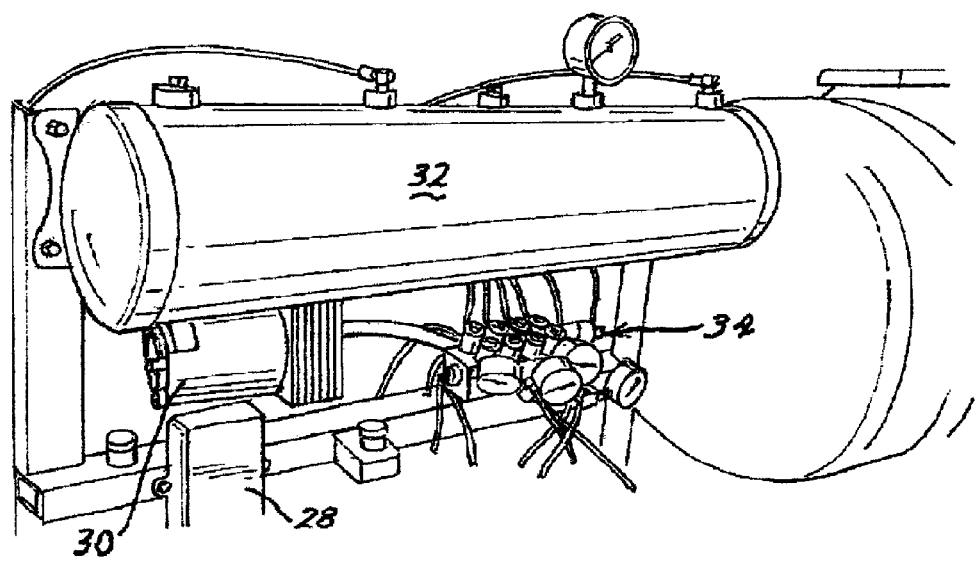
FIG. 3 is a perspective view of another portion of the downpressure system of this invention, particularly illustrating an air supply and control system for providing pressurized air to the downpressure applying devices shown in FIGS. 1 and 2.
Figure 4:
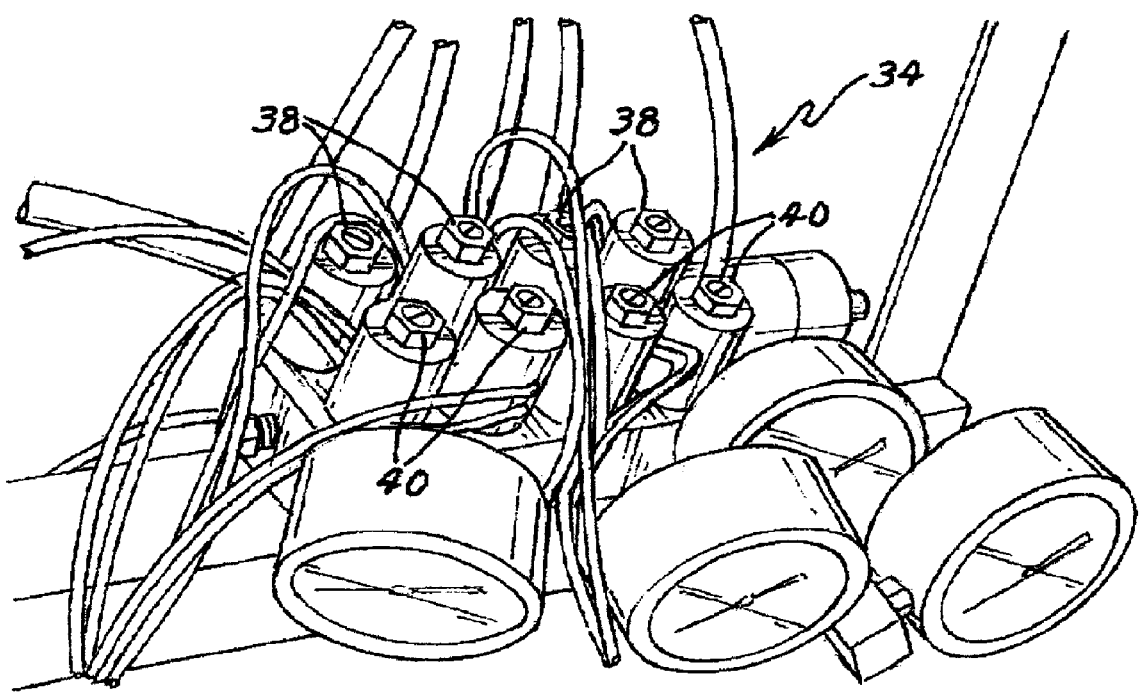
FIG. 4 is an enlarged perspective view of a valve block used in the air supply and control system of FIG. 3.
Figure 5:
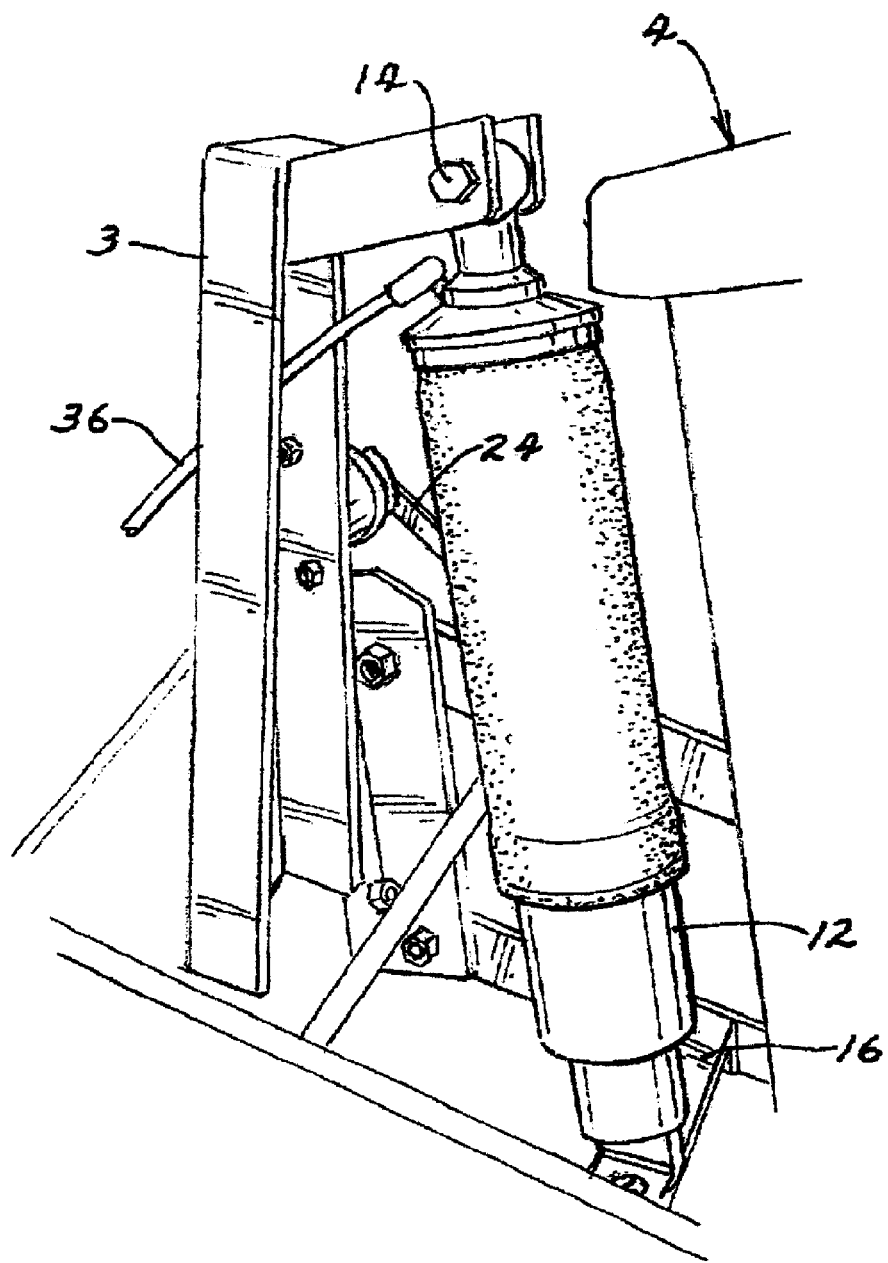
FIG. 5 is an enlarged perspective view of a portion of a downpressure applying device that can be used as part of this invention.

Referring now to FIGS. 3 and 4, the remaining portion of system 10 is an air supply and control system that comprises an electronic, microprocessor based controller 28 and a compressor 30 that is driven by a power source carried on tool bar 2 or on the tractor. When powered, compressor 30 is used to supply pressurized air to an air tank 32. Compressor 30 can run as needed so that air tank 32 functions as a large reservoir of pressurized air that is maintained at a predetermined pressure. Air tank 32 will supply pressurized air therefrom to each air shock 12 through a valve block 34.

Valve block 34 has an individual air valve (not shown but contained within valve block 34) for each air shock 12 such that valve block 34 will have as many air valves as there are air shocks 12. Each air valve within valve block 34 is connected to the air inlet of one of the air shocks 12 by a flexible air supply hose 36. Each air valve is connected both to air tank 32 as well as to an air exhaust port.

The air valve for each air shock 12 has three states. The first state is an off state of the air valve in which pressurized air neither passes into or out of supply hose 36 to air shock 12. This maintains the downpressure being supplied by air shock 12 on planter row unit 4 at its current level. The second state is an inlet state of the air valve in which air tank 32 is opened to air supply hose 36 to allow pressurized air to flow from air tank 32 into air shock 12 to increase the internal air pressure in air shock 12 to thereby increase the downpressure on planter row unit 4. The third state is an outlet state of the air valve in which air supply hose 36 is now connected to an exhaust port of the air valve to allow the internal air pressure in air shock 12 to bleed out through hose 36 and through the exhaust port to allow the internal air pressure in air shock 12 to decrease to thereby decrease the downpressure on planter row unit 4. The air valve will be automatically placed into these various states as need be by the operation of electronic controller 28.

Referring to FIG. 4, valve block 34 has two electrical control solenoids for each air valve, i.e. an air increase solenoid 38 and an air decrease solenoid 40. Electronic controller 28 electrically activates solenoids 38 or 40 to selectively put the air valve into either the air inlet or air outlet states thereof. When neither solenoid 38 or 40 is activated, the air valve is maintained in its off state.

Electronic controller 28 is connected in some fashion, i.e. either directly or through CANBUS communication, to the output of sensor 26 to receive a voltage signal therefrom. Electronic controller 28 is programmed to store a reference sensor voltage that corresponds to the downpressure in air shock 12 that is required to keep planter row unit 4 in a predetermined desired operational position relative to the ground. For example, when planter row unit 4 is in engagement with the ground and is at what the operator considers to be a proper working depth, the corresponding voltage being reported by sensor 26 can be assigned as the reference voltage. Let's assume for the sake of the following example that the reference voltage is 2.5 volts.

Importantly, this invention does not envision that electronic controller 28 would immediately correct for any variations of the sensor voltage from 2.5 volts. Instead, the operator has the ability to provide electronic controller 28 with three settings. The first setting is the amount of change in the voltage level from the reference voltage that is required before the electronic controller 28 would attempt a correction. The operator could pick from a plurality of preset settings, e.g. 5, 10, 15, 20, 25, 30, 40, 50, 60, or 70 millivolts, or input his or her own setting. Let's suppose the operator picked 5 millivolts as the voltage change threshold. Thus, the voltage reported by sensor 26 to controller 28 would have to change at least 5 millivolts up or down from the reference voltage of 2.5 volts before controller 28 would activate either the air increase solenoid 38 or air decrease solenoid 40 depending upon the direction of the voltage change relative to the reference voltage. For added flexibility, the user could pick or input different separate settings for the voltage change threshold depending upon whether controller 28 would be executing an air increase or air decrease, e.g. the voltage change threshold for an air increase could be 5 millivolts but could be 15 millivolts for an air decrease.

However, even if controller 28 detects a voltage change that meets the selected threshold, i.e. the voltage from sensor 26 has changed at least 5 millivolts up or down from the reference voltage of 2.5 volts in the example above, controller 28 would not immediately take corrective action. The second setting of controller 28 is how long the voltage change must be maintained, i.e. a voltage time threshold, before controller 28 takes action. Again, the operator could pick from a plurality of preset settings, e.g. 0, 10, 25, 50, 100, 200, 300, 500, 1000, or 3000 thousandths of a second, or input his or her own setting. In the example above, let's further suppose the operator has additionally picked 200 thousandths of a second as the voltage time threshold which equates to two tenths of a second. Thus, controller 28 will initiate corrective action only if both the voltage change threshold and the voltage time threshold are met, i.e. only if the voltage change is at least 5 millivolts higher or lower than the reference voltage of 2.5 volts and only if this voltage change is maintained for at least 200 thousandths of a second. If these two conditions are met, then controller 28 will activate either the air increase solenoid 38 or the air decrease solenoid 40 depending upon whether the voltage change was above or below the reference voltage.

The third setting of controller 28 is to allow the operator to pick an on time for how long the solenoids 38 or 40 are left open by controller 28. Once again, the operator can pick from a plurality of settings, i.e. 10, 20, 30, 40, 50, 75, 100, 150, 200, 300 hundredths of a second, or input his or her own setting. Thus, if the operator picks 150 hundredths of a second for the valve on time setting, then controller 28 will activate one of the solenoids 38 or 40 for 1.5 seconds. If operation within this valve on time setting does not restore the voltage reading to the reference voltage of 2.5 volts, then controller 28 will repeat the steps noted above in a closed loop control fashion until the reference voltage is restored. Thus, system 10 of this invention maintains a desired level of downpressure on each of the air shocks 12 and on each of the planter row units 4 automatically without any operator input other than for the selection of the three settings, i.e. the voltage change threshold, the voltage time threshold and the valve on time, described above.

Air shock 12 could be replaced by other types of downpressure applying devices, such as a bellows type air bag or by a hydraulic cylinder. If hydraulic cylinders replace air shocks 12, then a hydraulic fluid supply and control system for supplying pressurized hydraulic fluid to the hydraulic cylinders would be used in place of the air supply and control system with controller 28 having the same control methodology and settings. In the case of a hydraulic system, the hydraulic fluid supply and control system would return the pressurized fluid to the main hydraulic fluid reservoir during a pressure decreasing operation rather than exhausting to atmosphere as is done with air. A single air shock 12 could be replaced by dual air shocks with one air shock 12 pushing down on the parallelogram linkage 6, 8 and the other air shock 12 pushing up on the parallelogram linkage. In this dual air shock system, controller 12 would simultaneously increase the pressure in one air shock 12 and decrease the pressure in the other air shock 12 when making a correction. Moreover, the parallelogram linkages that support planter row units 4 could be replaced with other types of pivotal or non-pivotal linkages that permit movement of units 4 up and down relative to tool bar 2.

Various other modifications of this invention would be apparent to those skilled in the art. Thus, this invention is not limited to the details of the preferred embodiment described herein.

The invention claimed is:

1. An agricultural tool for mounting on a tool bar, the tool bar being operatively carried on or attached to a tractor, which comprises:
   (a) a unit that performs an action on a farm field to change a state of the farm field as the unit is moved over the farm field;
   (b) a linkage for movably mounting the unit on the tool bar for up and down movement of the unit relative to the farm field;
   (c) a system for applying downpressure to the unit to maintain the unit in a desired operational position relative to the ground, wherein the downpressure system comprises:
      (i) an air operated air shock that combines a downpressure air bag and a shock absorber, the air shock having first and second telescopic portions, wherein the first portion of the shock is attached to the tool bar and the second portion of the shock is attached to the linkage, the shock being extensible and contractible in length dependent upon a pressure level of the air inside the shock;
      (ii) a source of pressurized air;
      (iii) at least one valve between the source of pressurized air and the shock for supplying pressurized air to the shock or for removing the pressurized air from the shock; and
      (iv) an electronic controller connected to the valve for automatically operating the valve as the unit is moved over the farm field to add and remove as need be the pressurized air to the shock in a feedback control loop to substantially maintain the length of the shock at a predetermined length to establish and maintain a desired downpressure on the unit, further including a sensor in operative communication with the controller for sending to the controller an output signal that is representative of an actual downpressure on the unit, wherein the controller comprises a storage device for storing a reference output signal that corresponds to the desired downpressure on the unit, and wherein the controller further comprises:
         a user selectable setting for establishing an output signal change threshold comprising how far the output signal must vary from the reference output signal before the controller takes corrective action in the feedback control loop; and
         a user selectable setting for establishing an output signal time threshold comprising how long the output signal change threshold must be continuously present before the controller takes corrective action in the feedback control loop.

2. The tool of claim 1, further including a sensor for detecting changes in the length of the shock during operation of the unit, and wherein the controller receives an output signal from the sensor which is representative of the length of the shock.

3. The tool of claim 2, wherein the sensor is external to the shock.

4. The tool of claim 3, wherein the sensor is mounted on the tool bar with the sensor having a rotary input shaft that varies the output signal from the sensor as the input shaft rotates, and further including a linkage operatively connecting the sensor input shaft and the second portion of the shock such that the input shaft of the sensor is rotated in one direction when the shock lengthens and the input shaft of the sensor is rotated in an opposite direction when the length of the shock contracts.

5. The tool of claim 4, wherein the unit mounting linkage comprises a parallelogram linkage having at least one upper link arm and one lower link arm pivotally connecting the unit to the tool bar, and wherein the sensor connecting linkage is a pivotal linkage that extends between one of the link arms of the parallelogram linkage and the input shaft of the sensor.

6. The tool of claim 5, wherein the sensor connecting linkage comprises:
  (a) a lower pivot arm having one end pivotally connected to the one link arm of the parallelogram linkage;
  (b) an upper pivot arm having one end non-rotatably connected to the input shaft of the sensor; and
  (c) the other ends of the lower and upper pivot arms pivotally connected to each other.

7. The tool of claim 1, wherein the controller further comprises a user selectable setting for establishing a valve on time comprising how long the valve will be actuated in a corrective action after the output signal change threshold and output signal time threshold are both met.

8. The tool of claim 1, wherein a plurality of linkages mount a plurality of units on the tool bar in a laterally spaced manner with each unit being mounted by a linkage that is separate and distinct from the linkages that mount the other units, the plurality of units each having its own separate downpressure system with the exception that the pressurized air source and the controller are common to all the downpressure systems; and wherein the at least one valve to the air shock in each downpressure system comprises a plurality of pairs of valves in a valve bank, one valve in each pair being used for adding pressurized air to the air shock and the other valve in each pair being used for removing pressurized air from the air shock with each pair of valves in each downpressure system being separate and distinct from the other pairs of valves in the other downpressure systems.

* * * * *

UNITED STATES PATENT AND TRADEMARK OFFICE
CERTIFICATE OF CORRECTION

PATENT NO.        : 9,462,744 B2
APPLICATION NO.   : 14/192208
DATED             : October 11, 2016
INVENTOR(S)       : John D. Isaacson Page 1 of 1

It is certified that error appears in the above-identified patent and that said Letters Patent is hereby corrected as shown below:

In the Claims

Col. 6, Line 66, change "further including a sensor for" to --the sensor--; and
Col. 7, Line 1, change "an" to --the--.

Signed and Sealed this
Twentieth Day of December, 2016

Michelle K. Lee
*Director of the United States Patent and Trademark Office*